H. M. LUDWICK.
FLUID ACTUATED LATHE CHUCK.
APPLICATION FILED MAY 1, 1913.
1,075,715.
Patented Oct. 14, 1913.
2 SHEETS—SHEET 2.
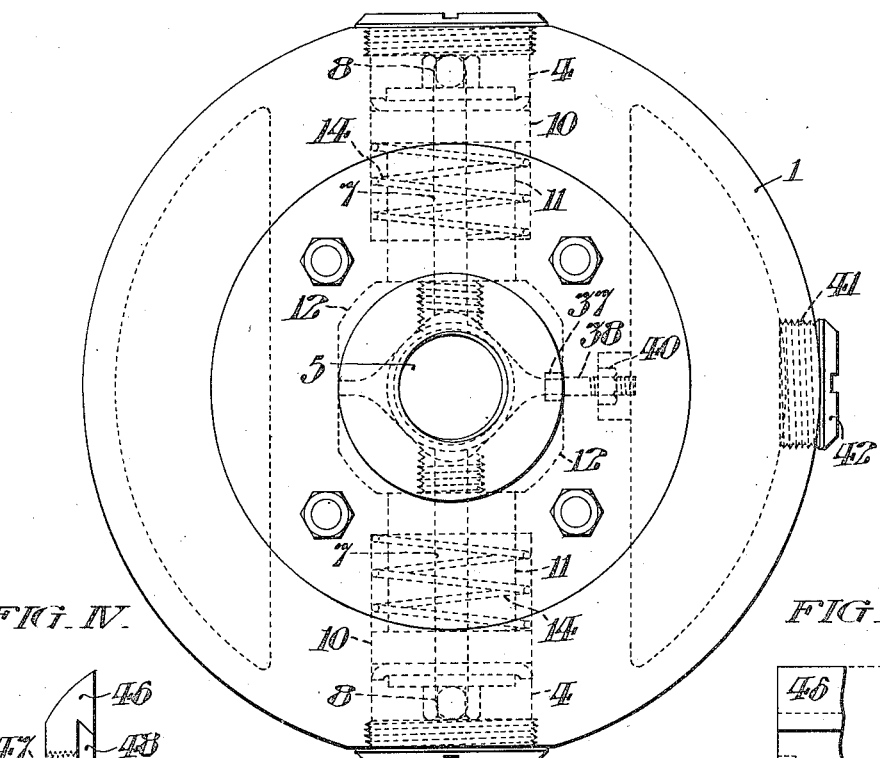
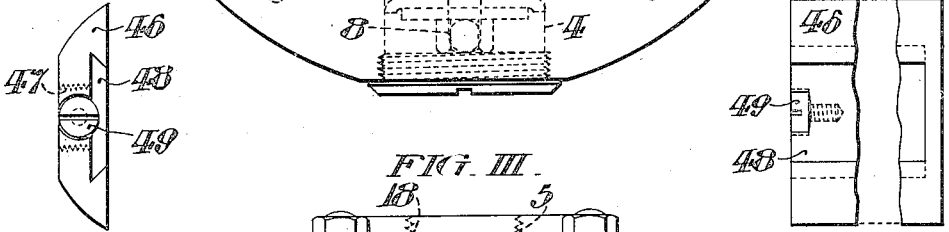
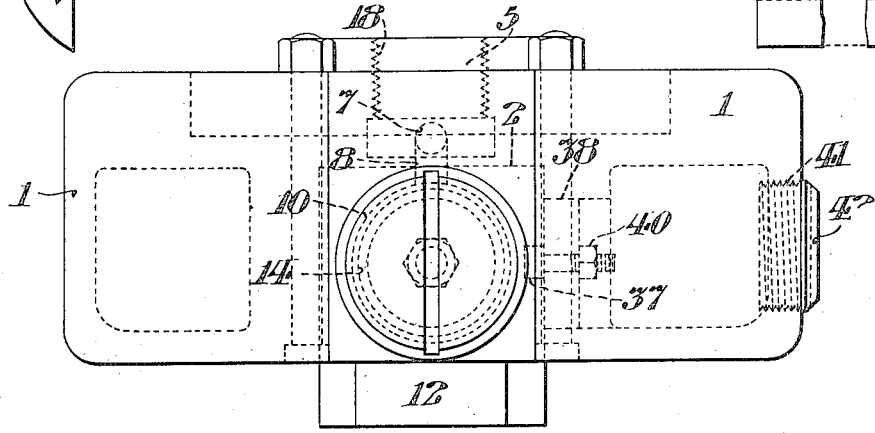
WITNESSES:
Philip W. Vessey
Joseph E. Segal
INVENTOR:
Harlan M. Ludwick
by Arthur E. Paige
Attorney.

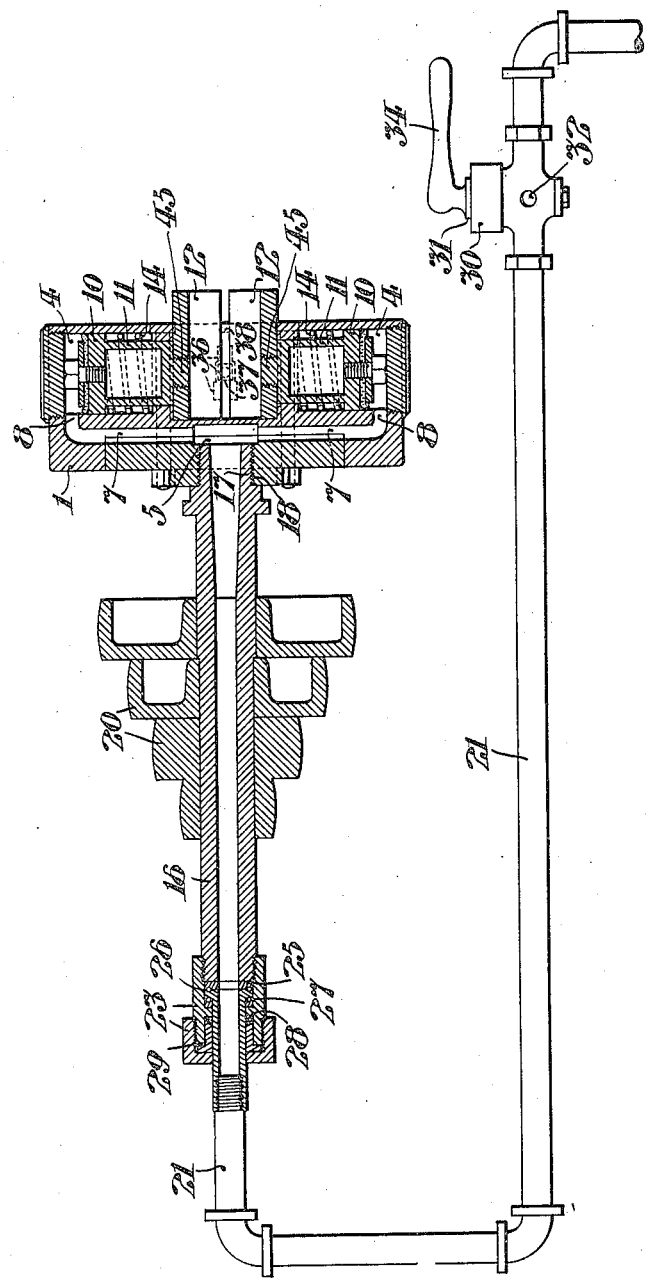

UNITED STATES PATENT OFFICE.

HARLAN M. LUDWICK, OF PARKESBURG, PENNSYLVANIA.

FLUID-ACTUATED LATHE-CHUCK.

1,075,715.

Specification of Letters Patent.   Patented Oct. 14, 1913.

Application filed May 1, 1913.   Serial No. 764,930.

*To all whom it may concern:*

Be it known that I, HARLAN M. LUDWICK, a citizen of the United States, residing at Parkesburg, in the county of Chester and State of Pennsylvania, have invented a certain new and useful Improvement in Fluid-Actuated Lathe-Chucks, whereof the following is a specification, reference being had to the accompanying drawings.

My invention relates to chucks having a plurality of jaws which are movable radially with respect to the axis of rotation of the chuck to engage and release work extending between them coincident with said axis.

As heretofore constructed, the jaws of fluid actuated chucks must be moved axially with respect to the chuck to engage and release the work between them; such movement being effected by mechanical means connecting such jaws with a fluid motor remote from the chuck. It is an object of my invention to provide a chuck having within its casing, which is removable and replaceable with respect to any ordinary lathe, a fluid motor for each of the jaws so constructed and arranged that it is unnecessary to move the jaws axially with respect to the chuck casing to effect their radial movement.

As hereinafter described, my invention includes the combination with a chuck casing having a central recess and a plurality of radially opposed cylindrical piston chambers, extending transversely with respect to the axis of rotation of said chuck and opening into said recess, an axial port at the rear of said casing, and passageways leading from said port to the outer ends of each of said chambers; of pistons respectively mounted to reciprocate in said chambers; piston rods respectively rigidly connected with said pistons and extending radially inward with respect to said casing; jaws respectively detachably secured at the inner ends of said piston rods; springs respectively encircling said piston rods, tending to separate said jaws when released; and means for supplying and exhausting compressed fluid through said port, including a hollow shaft detachably connected with said casing (being the hollow-mandrel of the live-head stock of the lathe); means on said shaft whereby it may be rotated; a stationary fluid pressure conduit in axial alinement with said shaft; a hermetical coupling for said shaft and said conduit permitting relative rotation thereof; and a valve controlling said conduit having a rotary plug arranged to direct compressed fluid to said chuck and to exhaust said fluid therefrom in accordance with the position thereof.

My invention includes the various novel features of construction and arrangement hereinafter more definitely specified.

In said drawings:—Figure I is a diagrammatic sectional view of a hollow-mandrel lathe with my improved chuck and appurtenances applied thereto. Fig. II is a rear face view of the chuck shown in Fig. I. Fig. III is a bottom edge view of said chuck as shown in Figs. I and II. Fig. IV is a front end view of a modified form of jaw. Fig. V is a fragmentary elevation of the inner face of the jaw shown in Fig. IV.

In said figures: the chuck casing 1 has the central recess 2 and the radially opposed cylindrical piston chambers 4, extending transversely with respect to the axis of rotation of said casing and opening into said recess, the axial port 5 at the rear of said casing, and passageways 7 leading from said port to openings 8 at the outer ends of each of said chambers 4. The pistons 10 are respectively mounted to reciprocate in said chambers 4 and have piston rods 11 respectively rigidly connected with them and extending radially inward with respect to said casing 1. The jaws 12 are respectively detachably secured at the inner ends of said piston rods 11. Each of said jaws is bifurcated as shown in Fig. II so as to center the work between them. Each of said pistons 10 is provided with a spring 14, encircling its rod 11, tending to separate said jaws when released.

As shown in Fig. I, said chuck is provided with means for supplying and exhausting compressed fluid through said port 5, including the hollow shaft 16 (being the hollow-mandrel of the head stock of the lathe) having the screw thread 17 detachably engaging the screw thread 18 in said chuck casing 1. Said shaft 16 is provided with the step pulley 20 whereby it may be rotated relatively to the stationary fluid pressure conduit 21 which is in axial alinement with said shaft and connected by the hermetical coupling including the screw sleeve 23 inclosing the bearing washer 25 and bearing balls 26 and 27 between said relatively rotary shaft 16 and conduit 21. Said sleeve also incloses the packing 28 and gland 29 which is adjustable to maintain the joint fluid tight. Said conduit 21 leads to a source of compressed air, or other fluid pressure, and is controlled by the valve 30 having the rotary plug 31 arranged to direct compressed fluid to said chuck and exhaust said fluid therefrom through the vent 32, in accordance with the position of said plug which is conveniently provided with the handle 34 by which it may be manually operated. It is to be understood that when said handle 34 is turned to the position shown in Fig. I the fluid pressure is admitted to said chambers 4 to drive the pistons 10 radially inward to rigidly engage the work which is extended axially in said recess 2 between said jaws. Such movement of said pistons and the jaws connected therewith is in opposition to the pressure of said springs 14. When it is desired to release said work; it is only necessary to turn said handle 34 transversely with respect to said conduit 21, thus shutting off the supply of compressed fluid, by said plug 31, and permitting the fluid from said chambers to exhaust through said vent 32. Said pistons 10 being thus released from the pressure upon their radial outer surfaces are thrust outward by their respective springs 14, thus opening said jaws 12.

In order to facilitate the operation of the chuck above described in connection with some classes of work, I prefer to provide the same with automatic gaging means arranged to stop said jaws 12 in symmetrical relation with the axis of said chuck as they approach each other under the fluid pressure. For instance, as indicated in dotted lines in Fig. I, I provide the proximal edges of the respective jaws (at the opposite side of the chuck from that shown in said figure) with gage recesses 36 arranged in opposed steps with differently sized spaces between them, and variably interpose between said steps a stop head 37 having a screw threaded shank which is adjustable, longitudinally with respect to the axis of the chuck, in the gage slot 38 in the chuck casing 1. As indicated in Figs. II and III said shank is engaged by a nut 40 bearing upon said casing and arranged to rigidly secure said stop head 37 in adjusted position. Said adjustable stop means are accessible through the peripheral opening 41 in said casing 1 which is conveniently normally closed by the screw plug 42. It is to be understood that said stop head 37 may be secured between any of the opposed pairs of steps in said jaws 12 with the result that said jaws are stopped in symmetrical relation at correspondingly different distances apart.

Although I have described my invention with reference to an ordinary form of lathe, it is to be understood that it is equally applicable to drill presses and similar devices, having jaws of different shapes. It may be observed that the jaws 12 aforesaid are detachably connected with the piston rods 11 by engagement with the screw threaded bosses 45 of the latter, as indicated in Fig. I; so that jaws of different shapes may be interchangeably connected with the pistons 10. For instance, as shown in Figs. IV and V jaws 46 having screw threaded sockets 47 adapted to fit said bosses 45 have undercut recesses 48 in their proximal faces to receive auxiliary jaws or other tool or work gripping devices which are detachably secured therein by the screws 49 which have their heads overhanging said recesses 48.

I do not desire to limit myself to the precise details of construction and arrangement herein set forth as it is obvious that various modifications may be made therein without departing from the essential features of my invention as defined in the appended claims.

I claim:—

1. In a lathe chuck, the combination with a casing having a central recess and two diametrically opposed cylindrical piston chambers having a common axis extending transversely with respect to the axis of rotation of said chuck, an axial port at the rear of said casing, and passageways leading from said port to said chambers; of pistons respectively mounted to reciprocate in said chambers; piston rods respectively connected with said pistons and extending radially with respect to said casing; jaws respectively secured at the ends of said piston rods in opposition to each other; springs tending to separate said jaws when released; a hollow shaft connected with said casing; means on said shaft whereby it may be rotated; a stationary fluid pressure conduit in axial alinement with said shaft; a hermetical coupling for said shaft and said conduit permitting relative rotation thereof; and valve means controlling said conduit.

2. The combination with a chuck casing having a plurality of cylindrical piston chambers, extending transversely with respect to the axis of rotation of said chuck, and a gage opening; of pistons respectively mounted to reciprocate in said chambers; jaws respectively operatively connected with said pistons; a variable gaging means including a stop head extending between said jaws, having means engaging said gage opening; and means for supplying and exhausting compressed fluid with respect to said chambers.

3. The combination with a chuck casing having a plurality of piston chambers, extending transversely with respect to the axis of rotation of said chuck; of pistons respectively mounted to reciprocate in said chambers; jaws respectively operatively connected with said pistons; and means for supplying and exhausting compressed fluid with respect to said chambers.

In testimony whereof, I have hereunto signed my name at Parkesburg, Chester county, Pennsylvania, this 29th day of April, 1913.

HARLAN M. LUDWICK.

Witnesses:
GEORGE W. LUFKIN,
JOHN R. HUMPTON.